(No Model.)
S. Z. DE FERRANTI.
ELECTROMOTOR ENGINE.
No. 457,875. Patented Aug. 18, 1891.
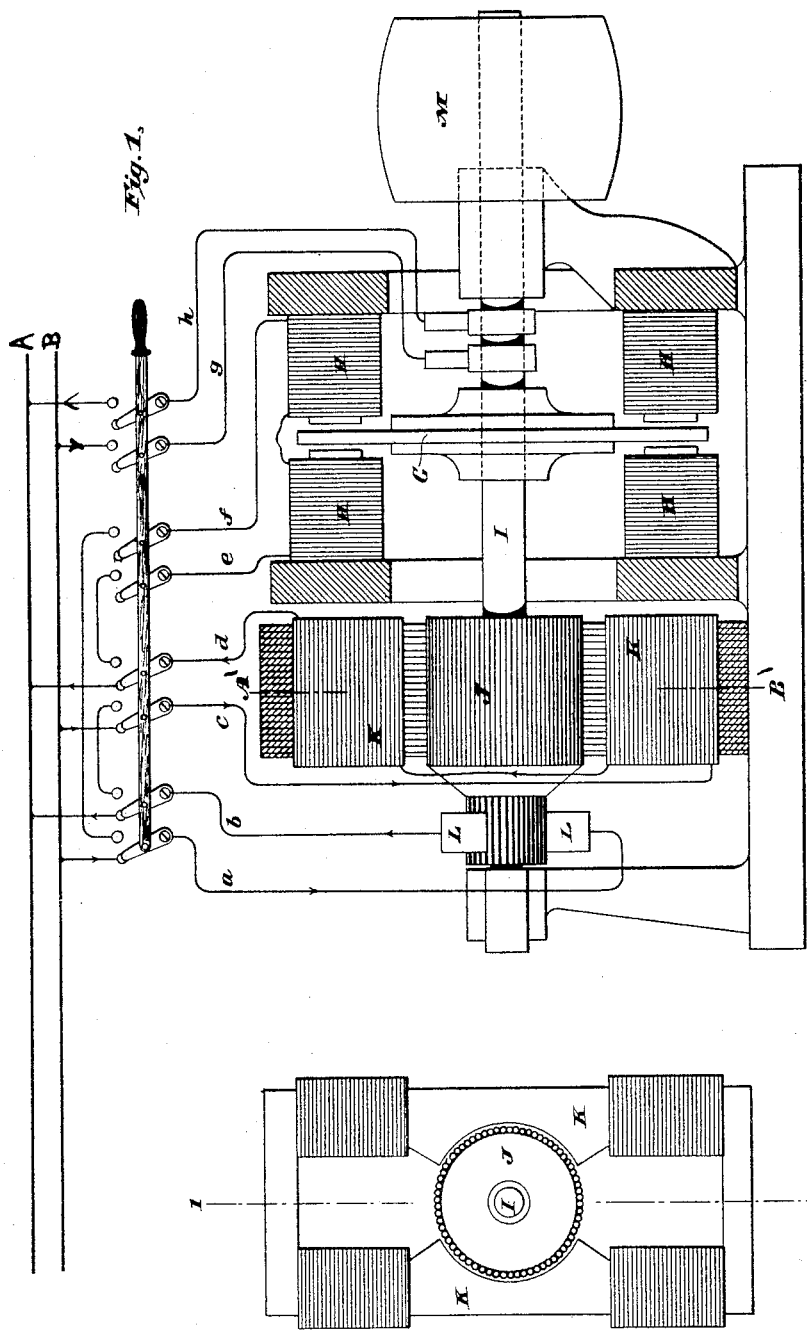
Witnesses
Geo. W. Breck
Edward Thorpe
Inventor
S. Z. de Ferranti
By his Attorneys
Baldwin Davidson & Wight
THE NORRIS PETERS CO., PHOTO-LITHO., WASHINGTON, D. C.

# UNITED STATES PATENT OFFICE.

SEBASTIAN ZIANI DE FERRANTI, OF HAMPSTEAD, ENGLAND.

ELECTROMOTOR-ENGINE.

SPECIFICATION forming part of Letters Patent No. 457,875, dated August 18, 1891.

Application filed September 24, 1888. Serial No. 286,206. (No model.) Patented in England September 13, 1887, No. 12,418; in France August 2, 1888, No. 192,192, and in Belgium August 3, 1888, No. 82,780.

*To all whom it may concern:*

Be it known that I, SEBASTIAN ZIANI DE FERRANTI, electrician, a subject of the Queen of Great Britain, residing at 120 Fellows Road, Hampstead, in the county of Middlesex, England, have invented certain new and useful Improvements in Electric Motors, (for which I have received Letters Patent in Great Britain, No. 12,418, dated September 13, 1887; in France, No. 192,192, dated August 2, 1888, and in Belgium, No. 82,780, dated August 3, 1888,) of which the following is a specification.

My invention relates to that class of electromotors driven by alternating currents.

It is known that a dynamo, generator, or motor capable, when driven, of producing an alternating current will, if an alternating current be supplied to it, run synchronously with the alternations of the current—that is, each part of its armature will pass from a position in front of one magnet-pole to a corresponding relation to the next magnet-pole of opposite polarity coincidently with the alternations in the current. Practically, however, such dynamos cannot be used as motors unless provided with means for readily revolving the motor-armature coincidently with the alternations in the current. This requirement involves a difficulty in starting such motors from a state of rest, as the generator alone, as ordinarily connected up with the motor, is incapable of starting it. Attempts have been made to attain this object by combining with an alternating-current generator and a corresponding motor a continuous-current generator for exciting the field-coils of the alternating-current generator and motor, and for driving a continuous-current motor on the same shaft as the alternating-current one to start the latter and synchronize it with its generator, at which time the continuous-current motor is cut out of circuit. Such an organization is cumbrous and complicated, involving the use of at least three mains and two continuous-current motors or their equivalents. The starting-motor, moreover, is inert when cut out of circuit after the synchronizing-armature comes into action.

Now it is the object of my invention to start an alternating-current motor from a state of rest in a simple and effective way by the direct action of an alternating current, which end I attain by employing a compound motor or two coupled motors, one non-synchronous with the alternating current by which it is driven and the other synchronous therewith. These two motors are so organized that the non-synchronous or starting one has both its field-coils and armature excited by an alternating current to start it and raise the armature of the alternating-current machine up to or above the proper synchronizing speed, at which moment the alternating current is transferred through the armature of the principal driven or synchronizing motor at the same time that the circuit through the non-synchronizing motor is cut out of the alternating main and converted into a closed circuit through the field-coils of both the motors. The alternating motor now drives the armature of the non-synchronizing motor, the revolutions of which produce continuous currents, exciting the field-coils of both motors, as above mentioned. This double function of the non-synchronizing armature enables me to dispense with an independent source for generating continuous currents, and of course correspondingly increases the efficiency and simplicity of the apparatus.

The accompanying drawings represent so much of an apparatus embodying my improvements as is necessary to illustrate the subject-matter designated in the claims at the end of this specification.

As this subject-matter consists of a novel organization of old instrumentalities, the details of construction of which form no essential part of the invention claimed, it is unnecessary to describe them in detail.

Figure 1 represents a side elevation of the compound motor and its circuit connections, partly in vertical longitudinal section; and Fig. 2 a vertical transverse section through the starting-motor on the line 1 1 of Fig. 1.

The armature G of the principal driven or synchronizing alternate-current motor is mounted on a shaft I, rotated in suitable bearings and carrying a driving-pulley M. This armature is without brushes or a commutator and is intended to run synchronously with the generator or the alternations of the driving-current. A series of electro-magnets H is arranged concentrically around the axis I on opposite sides of the armature G, the magnet-poles of each armature being of alternately opposite polarity.

The driving, starting, or non-synchronizing motor is shown in the drawings as provided with a Siemens armature J, mounted on the same shaft I as the armature G of the principal motor, and provided with coacting electro-magnets K K, the cores and pole-pieces of which are preferably composed of parallel iron plates insulated from each other, so that the magnets may be excited with an alternating current with as little loss as practicable. The alternating current is conveyed to the commutator of the Siemens dynamo through brushes L L.

The construction above described is the one preferred in practice. The starting-motor is likewise preferably made smaller than the principal one, it being only required to drive the armature G of the principal dynamo up to its synchronizing speed without other load.

In operation, the current passes from the alternate-current generator (not shown) through the mains A B and the branch wires $a$ $b$ and brushes L L to the commutator of the Siemens armature J of the secondary or driving motor, and thus starts it. The field-magnets of this motor are excited by the alternating current passing from the mains through the branch wires $c$ $d$. The magnets K thus receive their current directly from the main conductors, while the armature-coils receive their current from the same mains through the commutator, the effect of which, as is well known, is to enable the Siemens armature readily to be started. As both armatures are on the same shaft, they necessarily rotate together. When the speed with which the armature J drives the principal armature G rises above the speed at which the latter would be rotated were the current passed directly through it, the current is switched from the wires $a$ $b$ and $c$ $d$ of the Siemens motor and to the wires $g$ $h$, by which it passes directly from the mains through the principal armature G. At the same time the coils of the field-magnets H of the alternating motor and those K of the Siemens motor are connected or formed into a closed circuit, passing through the brushes L of this latter armature in well-known ways. Fig. 1 shows one way of doing this, which will readily be understood without further description, all the switches being adapted to be simultaneously actuated by a single lever. The Siemens armature is now in turn rotated by the alternating-current armature, thus generating continuous currents in the coils of the field-magnets H and K of both motors, as hereinbefore described, and keeping them properly excited. The principal armature G gradually slackens the speed of its rotation after the alternating current is directed through it, as above mentioned, to the speed at which that current will drive it, or, in other words, until it synchronizes with its generator or actuating alternating current, at which rate it will continue to revolve, and may be utilized for driving an endless band, passing over the pulley M, or in other ways.

I believe myself to be the first to start a motor from a state of rest by an alternating current in the organization hereinafter claimed, and also the first to cause the synchronizing motor when started to generate a continuous current for exciting the field-magnets of the synchronous motor.

As will be seen by the foregoing description, I am enabled by my improvements to energize the field-magnets and armatures of the starting dynamo by the direct action of the alternating current, and thereby to drive the alternating or synchronizing armature up to and above the proper synchronizing speed, after which it is driven directly by the alternating current, which is cut off from the starting-motor, which is in turn driven by it to produce continuous currents to energize the field-coils of both motors, which mode of operation, so far as I am aware, is entirely new.

I do not broadly herein claim an alternating-current non-synchronizing electric motor coupled with a synchronizing alternating-current motor, whereby the former starts the latter and throws it into synchronism with its actuating-current and circuit connections, whereby the latter motor may then be connected in circuit, nor the method of operating alternating-current motors, which consists in actuating a motor by an alternating current to bring a second alternating-current motor up to synchronizing speed relative to the actuating-current and then switching the synchronizing-motor into circuit.

Having thus fully described my improvements in electric motors, what I claim therein as new and as of my own invention is—

1. The combination of an alternating-current non-synchronizing electric motor, a single alternating-current circuit or conductor in which the field-coils of said motor are included, a synchronizing alternating-current motor coupled with said motor, the combination being substantially as hereinbefore set forth, whereby the non-synchronizing motor starts the synchronizing-motor and drives it into synchronism with the alternations of the actuating-current, and circuit connections whereby the synchronizing-motor may then be connected in circuit.

2. The combination of an alternating-current non-synchronizing electric motor, a single alternating-current circuit or conductor in which the armature of said motor is included, a synchronizing alternating-current motor coupled with said motor, the combination being substantially as hereinbefore set forth, whereby the non-synchronizing motor starts the synchronizing-motor and drives it into synchronism with the alternations of the actuating-current, and circuit connections whereby the synchronizing-motor may then be connected in circuit.

3. The combination of an alternating-current non-synchronizing electric motor, a single alternating-current circuit or conductor in which the field-coils of said motor are included, a single alternating-current circuit or conductor in which the armature of said motor is included, a synchronizing alternating-current motor coupled with said motor, the combination being substantially as hereinbefore set forth, whereby the non-synchronizing motor starts the synchronizing-motor and drives it into synchronism with the alternations of the actuating-current, and circuit connections whereby the synchronizing-motor may then be connected in circuit.

4. The combination, substantially as hereinbefore set forth, of an alternating-current non-synchronizing electric motor and an alternating-current synchronizing-motor coupled together and both fed from an alternating-current circuit, and a circuit from the non-synchronizing motor that energizes the alternating-current synchronizing-motor when the latter drives the former.

5. The combination, substantially as hereinbefore set forth, of a starting electric motor having both its field and armature coils energized by currents from a source producing an alternating current, and a synchronizing-motor adapted to be driven by the starting-motor up to the synchronizing speed, which is then continued by an alternating current.

6. The combination, substantially as hereinbefore set forth, of a starting non-synchronizing alternating-current electric motor, an alternating-current motor having its armature fed from an alternating-current wire, and circuit connections between the armature and field coils of the starting-motor and the field-coils of the synchronizing-motor.

7. The combination, substantially as hereinbefore set forth, of a source producing an alternating current, a starting alternating-current electric motor, a synchronizing alternating-current motor coupled therewith, and circuit connections and switches whereby the starting-motor, after having raised the synchronizing-motor to the proper speed, is in turn driven by it to produce continuous currents energizing the field-coils of both motors.

8. The hereinbefore-described compound electric motor, consisting of the combination of a starting-motor energized by currents from a source producing alternating currents, a synchronizing-motor having its armature mounted on the same shaft as the starting-armature, and circuit connections and switches by which the synchronizing-armature is connected with the source of the alternating currents simultaneously with the formation of a closed circuit through the field-coils of both motors, which coils are energized by continuous currents produced by the rotation of the armature of the starting-motor when driven by the synchronizing-motor.

9. The hereinbefore-described method of operating alternating-current electric motors, which consists in starting a motor by an alternating current, bringing a second motor coupled therewith up to synchronizing speed, then transferring the current through the synchronizing-motor, and simultaneously forming a closed circuit through the armature of the starting-motor and the field-coils of both motors, so that they may be excited by continuous currents produced by the rotation of the armature of the starting-armature driven by the synchronizing-motor.

SEBASTIAN ZIANI DE FERRANTI.

Witnesses:
JNO. H. WHITEHEAD,
24 *Southampton Buildings, London.*
WALTER J. SKERTEN,
17 *Gracechurch Street, London, E. C.*